United States Patent Office 3,824,313
Patented July 16, 1974

3,824,313
TOPICAL OPHTHALMIC COMPOSITION AND METHODS OF USE
John R. Smythies, Edinburgh, Scotland, assignor to Nelson Research & Development Company, Irvine, Calif.
No Drawing. Filed Mar. 16, 1973, Ser. No. 341,732
Int. Cl. A61k 27/00
U.S. Cl. 424—274                         9 Claims

ABSTRACT OF THE DISCLOSURE

A therapeutic composition comprising a topically administrable ophthalmic pharmaceutical carrier and Oxotremorine or its pharmaceutically acceptable acid addition salts. The foregoing composition temporarily alleviates the symptoms of glaucoma when topically administered to the eye.

BACKGROUND OF THE INVENTION

Field of the Invention

The present invention relates to a topical ophthalmic composition and method for the therapeutic use thereof. More particularly, the present invention relates to a topical, ophthalmic composition useful in temporarily alleviating the symptoms of glaucoma.

BACKGROUND OF THE PRIOR ART

1-[4(1-pyrrolidinyl)-2-butynyl] - 2 - pyrrolidinone or 1-(2-oxo-1-pyrrolidino) - 4 - (1-pyrrolidino)-but-2-yne, having the following formula,

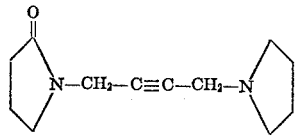

is a chemical compound known as "Oxotremorine." Oxotremorine is a metabolite of 1,1'-(2-Butynylene)dipyrrolidine, known as "Tremorine" from which Oxotremorine may be derived by oxidation of the carbon atom at position 2 of one of the pyrrolidine rings. These compounds are highly active muscarinic tertitary amines which have been used for studying cholinergic effects in both the peripheral and central nervous systems. Tremorine and especially its metabolite Oxotremorine have been used as pharmacological tools in screening compounds for anti-Parkinson activity because their intravenous administration creates a syndrome similar to that of Parkinson's disease.

Numerous methods for making Oxotremorine are known, e.g. U.S. Patent No. 3,444,185; Biochemical and Biophysical Research Communications, 5(4), 276–279, 1961; and J. Medicinal Chemistry 8:274, 1965. Oxotremorine also exhibits, upon intravenous administration, peripheral cholinergic effects (U.S. Pat. No. 3,444,171). British Pat. No. 1,079,467, corresponding to U.S. Pat. No. 3,444,185 also discloses that Oxotremorine, when intravenously administered to animals, results in a rapid and transitory drop in arterial pressure; and, when administered intraperitoneally in the anesthesized rat, creates a progressive and lasting drop in blood pressure. U.S. Pat. No. 3,354,178 further discloses aminoalkynes such as N-(4-amino - 2 - butynyl)-N-alkylcarboxamides as being stimulants of the central nervous system.

Glaucoma is a condition of the eye characterized by increased intraocular pressure. Untreated, the condition eventually leads to irreversible retinal damage and blindness. Conventional therapy for glaucoma is with pilocarpine and/or epinephrine administered topically several times daily.

SUMMARY OF THE INVENTION

The present invention relates to a therapeutic composition comprising a topically administrable ophthalmic pharmaceutical carrier and an effective amount of a compound selected from the group consisting of Oxotremorine and its pharmaceutically acceptable acid addition salts.

The present invention also relates to a method for temporarily alleviating the symptoms of glaucoma in humans comprising topically administering to the eyes of a human having glaucoma an effective amount of the foregoing composition.

DETAILED DESCRIPTION OF THE INVENTION

Oxotremorine can be made by any suitable method, e.g., the methods described earlier. As will be obvious to those skilled in the art, the non-toxic addition salts of Oxotremorine also may be prepared. Accordingly, it will be understood that conventional addition salts thereof are included within the present invention. Many physiologically and pharmaceutically acceptable salts are known to those skilled in the art and all such salts may be employed in the present invention. Examples of suitable acids to form salts with Oxotremorine include fumaric, hydrochloric, nitric, sulfuric and tartaric acids.

Suitable ophthalmic carriers are known to those skilled in the art and all such conventional carriers may be employed in the present invention. Thus, a particular carrier may take the form of a sterile, ophthalmic ointment, cream, gel, solution, or dispersion. Also including an suitable ophthalmic carriers are slow release polymers, e.g., "Ocusert" polymers, "Hydron" polymers, etc. Stabilizers may also be used such as, for example, chelating agents, e.g., EDTA. Antioxidants may also be used, e.g., sodium bisulfite, sodium thiosulfite, 8-hydroxy quinoline or ascorbic acid. Sterility typically will be maintained by conventional ophthalmic preservatives, e.g., chlorbutanol, benzalkonium chloride, cetylpyridium chloride, phenyl mercuric salts, thimerosal etc., for aqueous formulations, and used in amounts which are non-toxic and which generally vary from about 0.001 to about 0.1% by weight of the aqueous solution. Conventional preservatives for ointments include methyl and propyl parabens. Typical ointment bases include white petrolatum and mineral oil or liquid petrolatum. However, preserved aqueous carriers are preferred. Solutions may be manually delivered to the eye in suitable dosage form, e.g., eye drops, or delivered by suitable microdrop or spray apparatus typically affording a metered dose of medicament. Examples of suitable ophthalmic carriers include sterile, substantially isotonic, aqueous solutions containing minor amounts, i.e., less than about 5% by weight hydroxypropylmethylcellulose, polyvinyl alcohol, carboxymethylcellulose, hydroxyethylcelullose, glycerine and EDTA. The solutions are preferably maintained at substantially neutral pH and isotonic with appropriate amounts of conventional buffers, e.g., phosphate, borate, acetate, tris, etc.

A preferred ophthalmic composition is a preserved aqueous solution containing the following ingredients at the indicated concentration.

| | | |
|---|---|---|
| Oxotremorine | Wt. percent | 0.02 |
| Stabilizer | do | 0.01 |
| Preservative | do | 0.005 |
| Buffer | M | 0.05 |

NaCl q.s. ad isotonic.
Water q.s. ad 100 percent.

The amount of Oxotremorine to be used in the therapeutic treatment of glaucoma will vary with the age of the patient and the severity of the glaucoma. Generally a dose level of one or two drops of the foregoing aqueous solution 1–4 times daily would be a suitable dosage amount. Generally, the concentration of Oxotremorine will vary between about 0.001 and about 0.1 and preferably between about 0.005 and 0.02%.

I claim:

1. A therapeutic composition for topical ophthalmic use comprising a topically administrable ophthalmic carrier and an effective amount of a compound selected from the group consisting of Oxotremorine and a pharmaceutically acceptable acid addition salt thereof.

2. The composition of claim 1 wherein the carrier is a preserved, substantially isotonic, aqueous solution.

3. The composition of claim 2 wherein an effective amount of Oxotremorine is about 0.1%.

4. The composition of claim 1 wherein an effective amount of Oxotremorine is between about 0.001 and about 0.1 percent.

5. A composition comprising:

| | | |
|---|---|---|
| Oxotremorine | percent | 0.02 |
| Preservative | do | 0.005 |
| Stabilizer | do | 0.01 |
| Buffer | M | 0.05 |

NaCl q.s. ad Isotonic.
Water q.s. ad 100 percent.

6. A method for temporarily alleviating the symptoms of glaucoma in humans comprising topically administering to the eye of a human having glaucoma a composition of active constituent of which is an effective amount of a compound selected from the group consisting of Oxotremorine and a pharmaceutically acceptable acid addition salt thereof and the composition containing, in addition to the compound, a suitable ophthalmic pharmaceutical carrier therefore.

7. The method of claim 6 wherein the carrier is a preserved, substantially isotonic, aqueous solution.

8. The method of claim 6 wherein an effective amount of Oxotremorine is between about 0.001 and about 0.1 percent.

9. A method of temporarily alleviating the symptoms of glaucoma in humans comprising administering topically to the eye of a human having glaucoma 1-2 drops of the composition of claim 5, 1-4 times daily.

References Cited

Chem. Abst., vol. 74, 139247 G (1971).

Grollman, Pharmacology & Therapeutics, (1965), pp. 376–377.

STANLEY J. FRIEDMAN, Primary Examiner

UNITED STATES PATENT OFFICE
CERTIFICATE OF CORRECTION

Patent No. 3,824,313　　　　　　　　　　Dated July 16, 1974

Inventor(s) John R. Smythies

It is certified that error appears in the above-identified patent and that said Letters Patent are hereby corrected as shown below:

Column 2, line 29: "Also including an suit-" should read
--Also including as suit- --
Column 2, line 37: "cetylpyridium" should read
--cetylpyridinium--
Column 4, line 3: "of active constituent" should read
--the active constituent--

Signed and sealed this 12th day of November 1974.

(SEAL)
Attest:

McCOY M. GIBSON JR.　　　　　　　　　C. MARSHALL DANN
Attesting Officer　　　　　　　　　　Commissioner of Patents